US012626531B2

(12) United States Patent (10) Patent No.: US 12,626,531 B2
Orvalho et al. (45) Date of Patent: May 12, 2026

(54) SYSTEMS, METHODS AND MEDIA FOR DEEP SHAPE PREDICTION

(71) Applicant: Didimo, Inc., Leça da Palmeira (PT)

(72) Inventors: Verónica Costa Teixeira Pinto Orvalho, Oporto (PT); Alexis Paul Benoit Roche, Oporto (PT); Mariana Ribeiro Dias, Oporto (PT)

(73) Assignee: Didimo, Inc., Oporto (PT)

( * ) Notice: Subject to any disclaimer, the term of this patent is extended or adjusted under 35 U.S.C. 154(b) by 290 days.

(21) Appl. No.: 18/101,071

(22) Filed: Jan. 24, 2023

(65) Prior Publication Data

US 2023/0237840 A1 Jul. 27, 2023

Related U.S. Application Data

(60) Provisional application No. 63/303,194, filed on Jan. 26, 2022.

(51) Int. Cl.
*G06V 40/16* (2022.01)
*G06V 10/82* (2022.01)
(52) U.S. Cl.
CPC ............ *G06V 40/169* (2022.01); *G06V 10/82* (2022.01); *G06V 40/166* (2022.01)
(58) Field of Classification Search
CPC .... G06V 10/454; G06V 10/82; G06V 20/653; G06V 40/166; G06V 40/168; G06V 40/169; G06V 40/172
See application file for complete search history.

(56) References Cited

U.S. PATENT DOCUMENTS

| | | | |
|---|---|---|---|
| 11,222,466 B1 | 1/2022 | Naruneic et al. | |
| 2019/0122411 A1* | 4/2019 | Sachs | G06T 7/90 |
| 2020/0110925 A1 | 4/2020 | Wang et al. | |
| 2020/0327726 A1 | 10/2020 | Lin et al. | |
| 2021/0082136 A1 | 3/2021 | Nikitidis et al. | |
| 2021/0104086 A1* | 4/2021 | Wang | G06N 3/0895 |

(Continued)

OTHER PUBLICATIONS

M. Hargreaves, D. Ting, S. Bajan, K. Bhavnagri, R. Bassed and X. Chang, "A Generative Deep Learning Approach for Forensic Facial Reconstruction," 2021 Digital Image Computing: Techniques and Applications (DICTA), Gold Coast, Australia, 2021, pp. 1-7, doi: 10.1109/DICTA52665.2021.9647290. (Year: 2021).*

(Continued)

*Primary Examiner* — Michael J Vanchy, Jr.
(74) *Attorney, Agent, or Firm* — Carr & Ferrell LLP

(57) ABSTRACT

Exemplary embodiments include a computer-implemented method of training a neural network for facial reconstruction including collecting a set of 3D head scans, combining each feature of each 3D head scan with a weight to create a modified set of 3D head scans, training the neural network using the modified set of head scans, and inputting a real digital facial image into the neural network for facial reconstruction. Further exemplary embodiments include the set of 3D head scans comprising approximately a tenth or less in quantity in comparison to a quantity of the modified set of 3D head scans. The modified set of 3D head scans may comprise features found in the set of 3D head scans or the modified set of 3D head scans may consist of features found in the set of 3D head scans.

16 Claims, 4 Drawing Sheets

(56)     References Cited

U.S. PATENT DOCUMENTS

2021/0166088  A1      6/2021   Chen et al.
2023/0035282  A1*    2/2023   Huang ..................... G06N 3/08

OTHER PUBLICATIONS

Richardson, Elad, Matan Sela, Roy Or-El, and Ron Kimmel. "Learning detailed face reconstruction from a single image." In Proceedings of the IEEE conference on computer vision and pattern recognition, pp. 1259-1268. 2017. (Year: 2017).*

Kortylewski, Adam, et al. "Training deep face recognition systems with synthetic data." arXiv preprint arXiv:1802.05891 (2018). (Year: 2018).*

* cited by examiner

Synthetic samples. On the top row, color renders, and on the bottom row, normal maps

SYSTEMS, METHODS AND MEDIA FOR DEEP SHAPE PREDICTION

CROSS-REFERENCE TO RELATED APPLICATIONS

This U.S. Non-Provisional patent application claims the priority benefit of U.S. Provisional Patent Application Ser. No. 63/303,194 filed on Jan. 26, 2022 and titled, "Systems, Methods and Media for Deep Shape Prediction," the entirety of which, including all appendices, is hereby incorporated by reference.

FIELD OF TECHNOLOGY

Exemplary embodiments pertain to facial reconstruction.

SUMMARY

Exemplary embodiments include a computer-implemented method of training a neural network for facial reconstruction including collecting a set of 3D head scans, combining each feature of each 3D head scan with a weight to create a modified set of 3D head scans, training the neural network using the modified set of head scans, and inputting a real digital facial image into the neural network for facial reconstruction. Further exemplary embodiments include the set of 3D head scans comprising approximately a tenth or less in quantity in comparison to a quantity of the modified set of 3D head scans. The modified set of 3D head scans may comprise features found in the set of 3D head scans or the modified set of 3D head scans may consist of features found in the set of 3D head scans.

The facial reconstruction may result in an estimate of a subject's head geometry based on a weighted sum of a plurality of individual modified 3D head scans. The facial reconstruction may result in an estimate of a subject's shape of a face. The facial reconstruction may be performed without including a face of an actual human in the modified set of 3D head scans and the reconstruction may include recognition of a feature on the modified set of 3D head scans. The feature may be a dimension of a nose, a dimension of an ear and/or other dimensions. The facial reconstruction may result in an estimate of a subject's jawline shape, an estimate of a thickness of a subject's lip and/or other estimates.

Additionally, combining each feature of each 3D head scan with a projected weight may create a modified set of 3D head scans. The error between the predicted/putative weight and an actual weight may be measured and the neural network's weights for the error may be adjusted. The method may be stopped when the error converges and/or may be stopped when the error is near or at zero.

BRIEF DESCRIPTION OF THE FIGURES

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
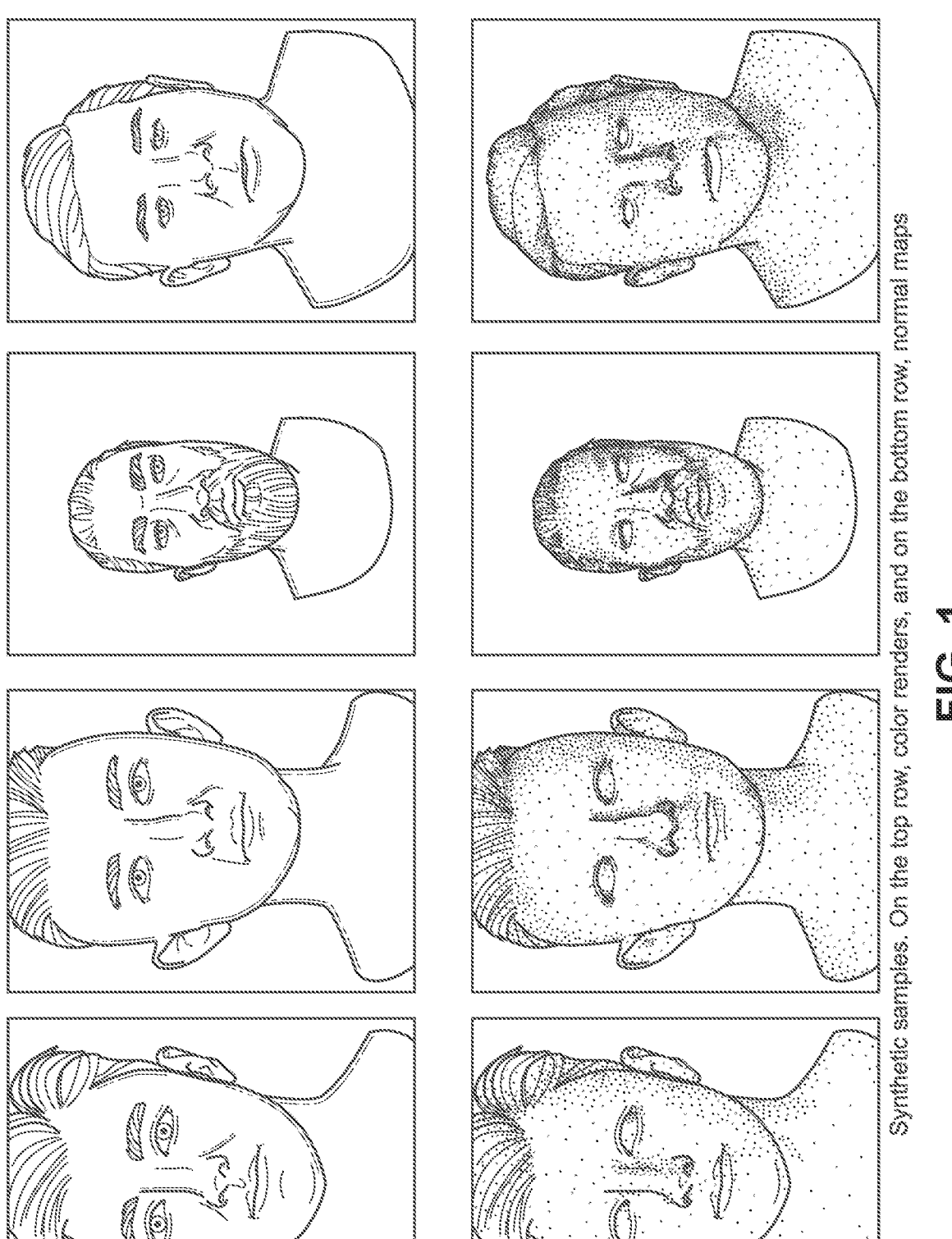

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 shows exemplary synthetic samples.

Figure 2A:
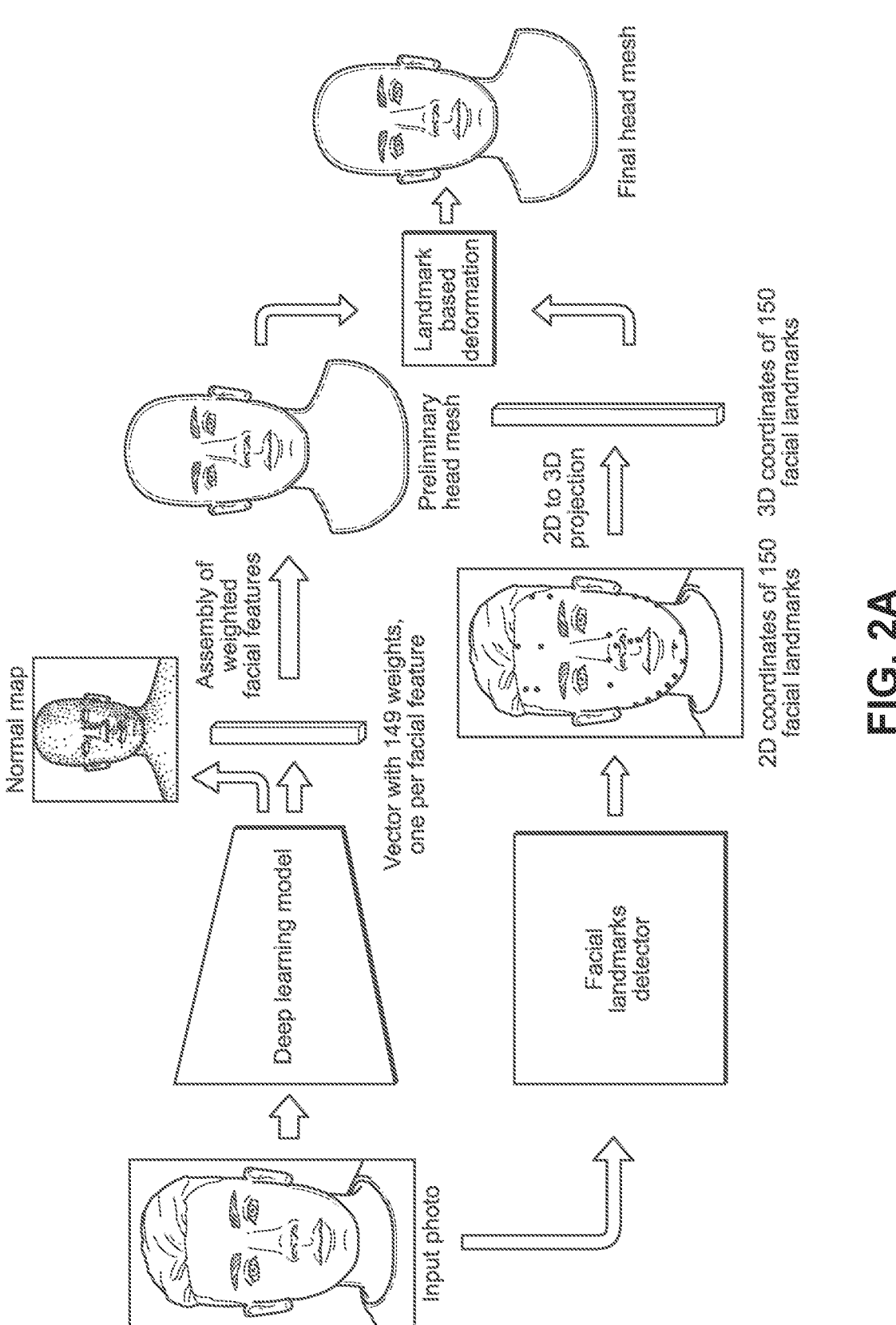

FIG. 2A shows a flow chart showcasing a process described herein.

Figure 2B:
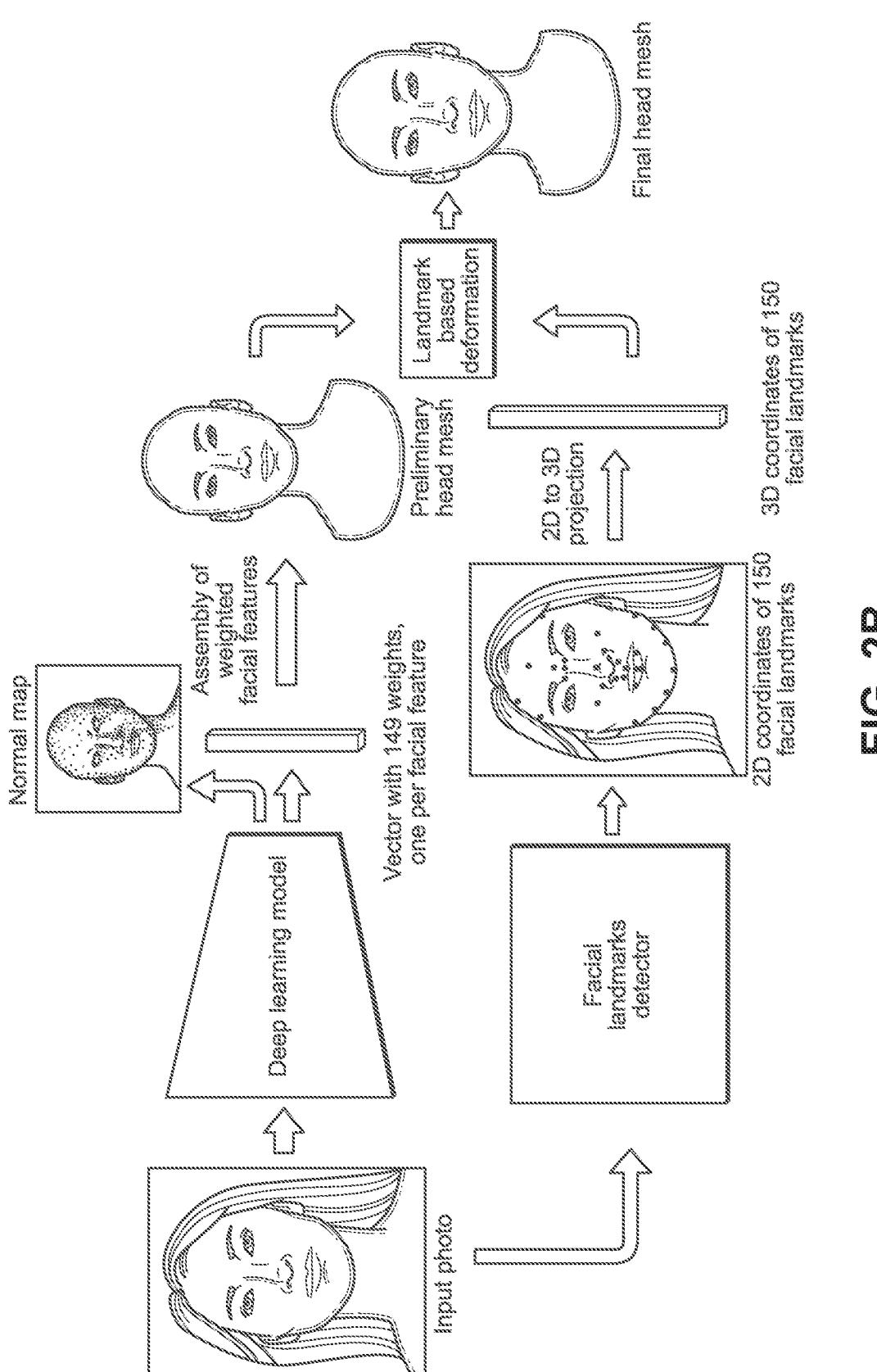

FIG. 2B shows another flow chart showcasing a process described herein.

Figure 3:
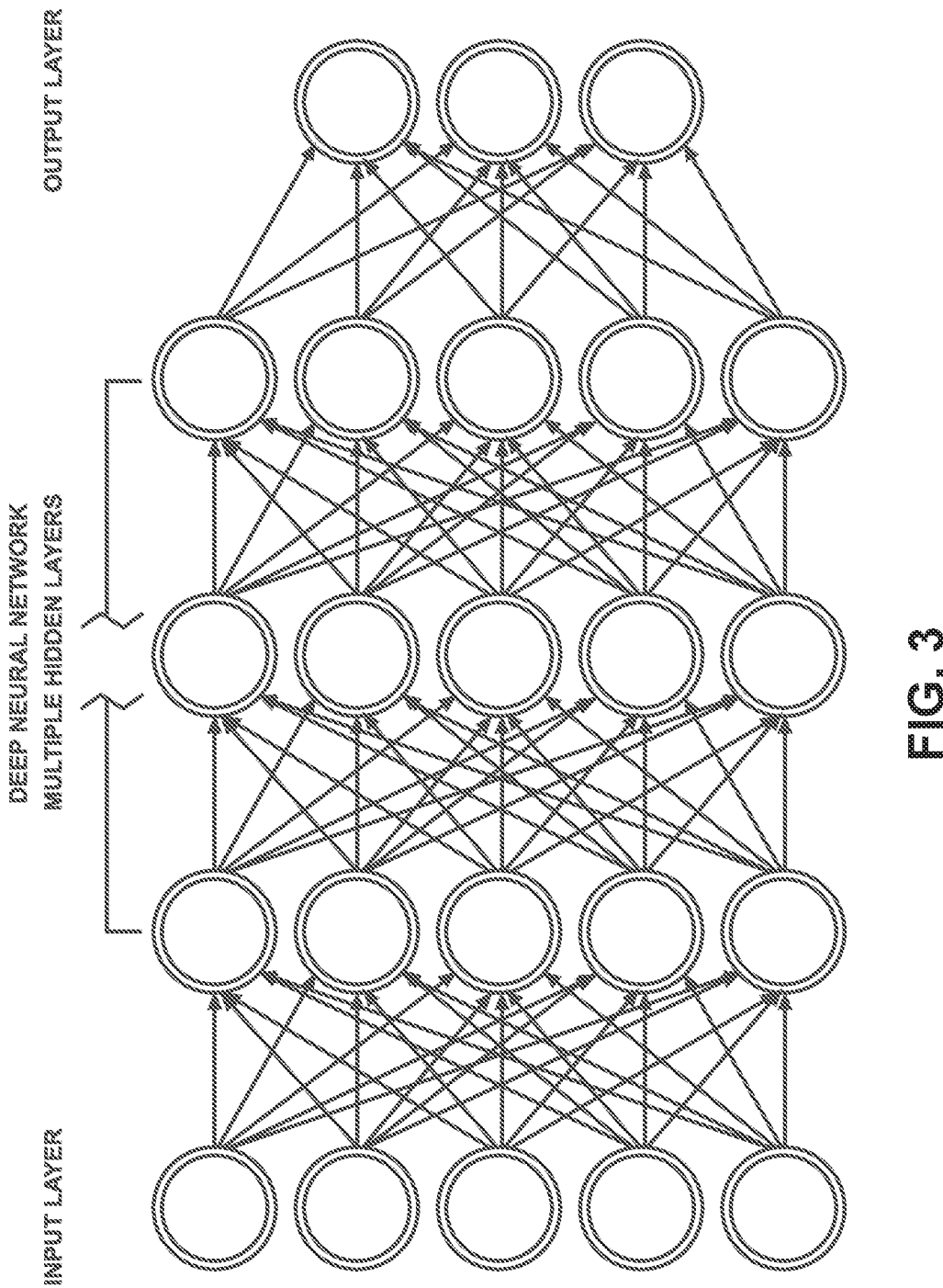

FIG. 3 shows an exemplary deep neural network.

DETAILED DESCRIPTION

The 3D geometric reconstruction of a human face from a single photo has been a very active research topic in the last 20 years due to its impact on a broad range of applications, such as:

Facial recognition;

Facial animation and reconstruction of expressions;

Building avatars for gaming and VR;

In the medical field, for the segmentation of anatomical structures and modeling of their variations; and In the forensics field, to estimate possible faces from a skull or to perform facial aging.

The state-of-the-art for the 3D reconstruction of the human face relies on 3D Morphable Models (3DMM). A 3DMM is a statistical model that captures head shape variations in a population from a set of 3D head scans. These can be between-subject variations (shape differences across individuals in a neutral facial expression) or within-subject variations (changes in facial expressions). A 3DMM is built by first collecting and aligning meshes reconstructed from the head scans in the same topology. Next, a classical exploratory statistical method known as principal component analysis is used to extract features, which can be thought of as elementary deformations of a mean shape, that contribute most to the variance of the dataset. Those features can be linearly combined with the average face shape to predict unobserved shapes. The use of 3DMM ensures that the face reconstruction produces a plausible shape. Using 3DMM, the problem of reconstructing a head shape comes down to estimating the weights that the respective facial features should have to accurately approximate a face from an image. There are several methods to achieve this. Early approaches render an initial estimate of the head and texture using a pre-defined light model, and estimate the weights of the features according to the error between the render and the input photo in an iterative fashion. Those approaches are highly sensitive to the lighting model and materials used to render, therefore new methods emerged, most of which are machine learning strategies that predict the shape weights from an input image using intermediate face representations such as landmarks, normals, or depth. Finally, some deep learning methods were developed to estimate the weights directly from the photo without using intermediate representations. Some of these methods generate training data with "ground truth" shapes by fitting training images with a pre-existing head reconstruction method, thereby accumulating its error to the error of their custom models. Other methods stand out from the previous ones by using synthetically rendered facial images to train the model and refining the predicted face shapes with non-rigid deformation.

Provided herein are exemplary systems, methods and media including a custom 3DMM and a deep learning model to directly estimate a face shape through its weights in the 3DMM that best match an input photo without relying on any intermediate representation. In other words, this deep learning model takes as input a photo and outputs a 3D head mesh. This head mesh is further deformed using facial landmarks independently extracted from the input photo to further refine the shape reconstruction results, see the sketches in FIGS. 2A and 2B. The shape estimation approach herein utilizes a convolutional neural network that takes as input a photo and predicts the weights that best represent the face and the corresponding normal map. To train the model, an extensive and realistic synthetic dataset of non-existing faces is produced by randomly sampling a 3DMM (i.e., producing random plausible head shapes), and rendering the resulting heads under a comprehensive range of light conditions, camera settings, and poses. A wide range of cameras is simulated from real smartphones to professional cameras. A database of high dynamic range images (HDRIs) is used to simulate realistic lighting conditions. Each random shape is paired with face and eye textures, and beard and hair meshes. For all samples, we render color and normals. FIG. 1 shows examples of the samples. While the training relies on synthetic data, realism is a strong focus, and conditions good prediction performance on real photos.

The inventors chose a standard deep learning model formally known as Densenet 121. The inventors tested several standard models of various complexity and chose Densenet 121 because they found it experimentally to provide the best performance. The model is able to learn relevant features from the synthetic training data that also apply to real test data. It is also lightweight, in the sense that it relies on relatively few parameters and can therefore run fast in prediction mode, which is relevant for the inventors' particular application. The model was pre-trained using the freely available classical ImageNet dataset for a standard image classification task, which is significantly different from the inventors' shape prediction task, hence it can be said that the model "learned a lot" during the training. Some other systems use a pre-trained model, but the pre-training performed was for a facial recognition task, which is arguably much more related to shape prediction and requires a large amount of facial data, which is hard to obtain and often not available for commercial usage. Hence, the inventors' approach avoids the burden of having to pre-train the model in complex tasks and still produces state-of-the-art results. The inventors used a standard procedure to train the model. The key differences between the inventors' work and other systems include:

Regarding the training dataset, the inventors use Blender to render while others use V-ray.

The inventors' shading approach has greater complexity than others, which only use diffuse and specular maps for shading.

The inventors use a higher range of lighting scenarios— 107 HDRIs that the inventors randomly rotate, further augmenting the variety of scenarios—while others rely solely on manual lighting scenarios.

The inventors' samples are paired with beard and hair assets since those are natural in real photos, and the inventors want their model to behave robustly in their presence. Others do not use any complementary assets. Considering everything mentioned above the inventors' samples approximate better real photos and may lead to a more robust model.

In some exemplary embodiments, the inventors' underlying face mesh has a higher vertex count than others: approximately 12.466 versus approximately 2.925 vertices. The vertex count of others may be lower and may be insufficient to capture more subtle facial features.

Other models are trained in outputs directly the vertex coordinates, while the inventors' model outputs the weights of the 3DMM features—the inventors' output is in a significantly lower-dimensional space, facilitating the training procedure.

The encoder used in others is an off-the-shelf facial recognition network with frozen weights—only the weights of the fully connected layers are trained. In the inventors' model, the encoder is the Densenet 121 pre-trained for classification on ImageNet, and both the encoder and the decoder are optimized. While the training in others requires weights from a highly related task, the inventors' model is trained successfully from a more generic and flexible task.

Besides the weights of the features, the inventors' model optionally predicts normal maps which may be used to further refine the face shape and to realistically shade the mesh produced in a rendering engine.

Summarizing the shape reconstruction method the inventors have developed:

1. The inventors use a deep learning model to predict the shape weights in a custom 3DMM, and optionally the normal map, from an image without needing an intermediate representation, which makes the inventors' model fast and usable in real-time applications.

The inventors developed a method to generate broad and realistic synthetic training data, which enables good shape prediction performance in real images without using real data to train the model (hence avoiding the need to acquire a large amount of 3D scans of real people).

3. The shape predicted using the inventors' deep learning model is refined using a more traditional landmark-based deformation method for highly accurate reconstruction results.

4. The inventors' method introduced some innovative details, in particular the prediction of a normal map simultaneously with shape coefficients.

Extra details about the model chosen.

The inventors selected a convolutional neural network (CNN) architecture called Densenet 121. The inventors chose it because in preliminary tests it outperformed other architectures, achieving higher accuracy. It provides better generalization capability and less overfitting than the more complex models tested. The inventors only considered architectures for which the framework they used to implement this work provided pre-trained weights—that is, weights obtained by training the model in another minimally related task. The inventors used the pre-trained weights to initialize the network instead of initializing it randomly or with some pre-defined rule. Having pre-trained weights as the initial state of the model helps to accelerate the optimization and to achieve higher accuracy. This process is formally known as Transfer Learning. Common Transfer Learning approaches freeze some of the pre-trained weights, optimizing solely higher layers. In the inventors' approach, they don't freeze any layers and optimize the entire model. The inventors chose this strategy because the pre-trained weights for the model they chose were obtained by training it in a task quite different from the inventors, which was expected since the inventors' task lies in a particularly specific domain. Works similar to the inventors use models pre-trained for face recognition, which share more similarities with the inventors' task and may allow freezing weights.

However, having those pre-trained weights requires training yet another highly complex task, which is a significant dependency for the quality of their results. The inventors' approach avoids the burden of having to pre-train the network in such a heavy task and still produces state-of-the-art results. In some exemplary embodiments, the actual optimization of the model may follow standard procedures: it uses the Adam optimizer with a fixed learning rate and a loss function that combines the prediction error of the weights of the 3DMM and the prediction error of the normal maps. In other exemplary embodiments, the actual optimization of the model may follow different procedures.

FIG. 1 shows exemplary synthetic samples.

On the top row are color renders, and on the bottom row, normal maps.

FIGS. 2A and 2B show flow charts showcasing processes described herein.

FIG. 3 shows an exemplary deep neural network.

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) are comprised of node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural networks rely on training data to learn and improve their accuracy over time. However, once these learning algorithms are fine-tuned for accuracy, they are powerful tools in computer science and artificial intelligence, allowing one to classify and cluster data at a high velocity. Tasks in speech recognition or image recognition can take minutes versus hours when compared to the manual identification by human experts. One of the most well-known neural networks is Google's search algorithm.

In some exemplary embodiments, one should view each individual node as its own linear regression model, composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming the input of the next node. This process of passing data from one layer to the next layer defines this neural network as a feedforward network. Larger weights signify that particular variables are of greater importance to the decision or outcome.

Most deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

In machine learning, backpropagation is an algorithm for training feedforward neural networks. Generalizations of backpropagation exist for other artificial neural networks (ANNs), and for functions generally. These classes of algorithms are all referred to generically as "backpropagation". In fitting a neural network, backpropagation computes the gradient of the loss function with respect to the weights of the network for a single input—output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are commonly used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming. The term backpropagation strictly refers only to the algorithm for computing the gradient, not how the gradient is used; however, the term is often used loosely to refer to the entire learning algorithm, including how the gradient is used, such as by stochastic gradient descent. Backpropagation generalizes the gradient computation in the delta rule, which is the single-layer version of backpropagation, and is in turn generalized by automatic differentiation, where backpropagation is a special case of reverse accumulation (or "reverse mode").

With respect to FIG. 3, according to exemplary embodiments, the system produces an output, which in turn produces an outcome, which in turn produces an input. In some embodiments, the output may become the input.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A computer-implemented method of training a neural network for facial reconstruction comprising:
    collecting a synthetic dataset of non-existing 3D head scans produced by randomly sampling a 3D morphable model and rendered under diverse lighting conditions, camera settings, and pose conditions, wherein the diverse lighting conditions comprise rendering using high dynamic range images (HDRIs);
    combining each feature of each 3D head scan with a projected weight to create a modified set of 3D head scans;
    measuring an error between the projected weight and an actual weight;
    adjusting neural network weights for the error and repeating the measuring and adjusting until the error converges or is near or at zero;
    training the neural network using the modified set of 3D head scans; and
    inputting a real digital facial image into the neural network for the facial reconstruction.

2. The computer-implemented method of claim 1, the synthetic dataset of non-existing 3D head scans comprising approximately a tenth or less in quantity in comparison to a quantity of the modified set of 3D head scans.

3. The computer-implemented method of claim 1, wherein the modified set of 3D head scans comprises features found in the synthetic dataset of non-existing 3D head scans.

4. The computer-implemented method of claim 1, the facial reconstruction resulting in an estimate of a subject's head geometry based on a weighted sum of a plurality of individual modified 3D head scans.

5. The computer-implemented method of claim 1, the facial reconstruction performed without including a face of an actual human in the modified set of 3D head scans.

6. The computer-implemented method of claim 1, the facial reconstruction including recognition of a feature on the modified set of 3D head scans.

7. The computer-implemented method of claim 6, the feature being a dimension of a nose.

8. The computer-implemented method of claim 6, the feature being a dimension of an ear.

9. The computer-implemented method of claim 1, the facial reconstruction resulting in an estimate of a subject's jawline shape.

10. The computer-implemented method of claim 1, the facial reconstruction resulting in an estimate of a thickness of a subject's lip.

11. The computer-implemented method of claim 1, further comprising combining each feature of each 3D head scan with the projected weight, wherein the projected weight is randomly sampled from a 3D morphable-model parameter distribution derived from principal-component analysis of a training dataset, to create a modified set of 3D head scans.

12. The computer-implemented method of claim 11, wherein the error is computed using a loss function that combines prediction error of the 3D morphable-model parameter distribution and prediction error of a concurrently predicted normal map.

13. The computer-implemented method of claim 12, further comprising adjusting the neural network's weights for the error, wherein the adjustment is performed by an Adam optimizer executing with a fixed learning rate.

14. The computer-implemented method of claim 13, further comprising stopping the method when the error converges.

15. The computer-implemented method of claim 13, further comprising stopping the method when the error is near or at zero.

16. The computer-implemented method of claim 1, the facial reconstruction resulting in an estimate of a subject's shape of a face.

* * * * *